United States Patent [19]
Greefkes

[11] Patent Number: 5,225,176
[45] Date of Patent: Jul. 6, 1993

[54] PROCESS FOR THE REMOVAL OF SULFUR OXIDE CONSTITUENTS FROM A WASTE GAS

[75] Inventor: Johannes Greefkes, Beverwijk, Netherlands

[73] Assignee: Hoogovens Groep B.V., Ijmuiden, Netherlands

[21] Appl. No.: 785,759

[22] Filed: Oct. 31, 1991

[30] Foreign Application Priority Data

Nov. 8, 1990 [NL] Netherlands ............. 9002428

[51] Int. Cl.$^5$ .............................. C01B 17/00
[52] U.S. Cl. .................. 423/243.01; 423/243.08
[58] Field of Search ........... 423/242 A, 242 R, 512 A

[56] References Cited

U.S. PATENT DOCUMENTS

| | | | |
|---|---|---|---|
| 3,616,597 | 11/1971 | Stewart | 55/19 |
| 3,899,099 | 8/1975 | Oiestad | 423/242 |
| 4,147,756 | 4/1979 | Dahlstrom et al. | 423/242 |
| 4,152,218 | 5/1979 | Narita et al. | |

FOREIGN PATENT DOCUMENTS

| | | | |
|---|---|---|---|
| 548829 | 11/1957 | Canada | 423/242 |
| 2127480 | 10/1972 | France | . |
| 2183955 | 12/1973 | France | . |
| 1130384 | 12/1984 | U.S.S.R. | . |

OTHER PUBLICATIONS

Patent Abstracts of Japan vol. 8, No. 225(C-247)(1662) Oct. 1984 (JP-A-59 109 225).

*Primary Examiner*—Gregory A. Heller
*Attorney, Agent, or Firm*—Stevens, Davis, Miller & Mosher

[57] ABSTRACT

A waste gas from a chemical process is treated to remove undesirable substances, especially sulphur dioxide, by contacting said waste gas with acidic solution, e.g. industrial waste solution, at pH less than 2 to effect pre-cleaning, and then contacting said waste gas with alkaline solution e.g. seawater.

10 Claims, 2 Drawing Sheets

PROCESS FOR THE REMOVAL OF SULFUR OXIDE CONSTITUENTS FROM A WASTE GAS

BACKGROUND OF THE INVENTION

1. Field of the Invention

The invention relates to a method and apparatus for the treatment of waste gases produced in chemical processes. In particular the invention relates to the treatment of waste gases to remove undesirable constituents, such as sulphur dioxide.

2. Description of the Prior Art

It is known to treat waste gases with an alkaline solution, e.g. environmental or surface water such as seawater, in order to remove harmful substances. For example, a method is known in which waste gase is scrubbed with seawater. Seawater is useful in this context because of its natural alkalinity.

In this gas scrubbing method, seawater absorbs sulphur dioxide, and then the sulphite formed is converted by oxidation to sulphate. This process can be carried out in an absorber and a downstream aerator. The used seawater laden with sulphate is then returned into environmental surface water. Examples of such processes using seawater are given in U.S. Pat. No. 4,152,218, GB-A-1356972 and GB-A-1410884. A drawback of this known method is that the returned seawater is also laden with other harmful constituents of the waste gas. In many chemical processes these constituents are produced and load the seawater in such a high concentration that the used seawater cannot be returned to the surface water. As a result of this, the known method has only limited application.

SUMMARY OF THE INVENTION

An object of the present invention is to provide a method of the kind described above in which the loading and contamination of the alkaline solution, e.g. seawater is reduced.

Another object of the invention also is to provide a method of the kind described above which is applicable in a broad range of chemical processes.

The method in accordance with the invention is characterised in that, prior to the treatment with an alkaline solution, the waste gas is precleaned by contacting it with an acidic solution, e.g. acidic waste water This has the advantage that components from the waste gas which are not desired in the alkaline solution, are removed from the waste gas by the pre-cleaning. For example, acid pre-scrubbing removes gaseous and dusty components and polycyclic aromatic hydrocarbons (PAHs) to a large extent.

A further advantage is that the amount of alkaline solution required for removing constituents from waste gas is less in the method according to the invention because some of the constituents are absorbed by the acidic waste water.

Yet another advantage is the prevention of a sudden large loading of the alkaline solution, e.g. seawater, with a heavy contamination. An example of this could be a sudden loading as a result of a defect in an installation part such as a dust filter. With the method in accordance with the invention the loading is considerably reduced because a large part of it is taken up in the acidic water.

Another advantage is that the waste gas already gives off part of its heat during the pre-cleaning so that, when hot waste gas is being treated, the temperature rise of the alkaline solution such as seawater is less than with the known process. There follows the important advantage that the oxygen concentration in the seawater is also higher and this is favorable from the biological point of view. For example, any living organisms present in the seawater are better able to survive if the oxygen content is maintained and temperature fluctuations avoided.

In one preferred form of the method according to the invention, the acidic solution comprises residual water from the chemical process producing the waste gas or from an auxiliary process related to this chemical process. In this embodiment the acidic waste water is chemically cleaned in a further cleaning process.

In many chemical processes, water is used (in the process itself or an auxiliary process) and ends up as residual waste water which is taken straight to a chemical water cleaning station. By using this residual water as the acidic solution in pre-cleaning, a need for an additional flow of water may be avoided.

Another advantage is that the residual water may contain elements or compounds which react chemically with elements or compounds from the waste gas so that a very high degree of waste gas cleaning can be achieved.

At the same time this achieves the advantage that the acidic solution may be cleaned simultaneously with other residual water, by chemical water purification, and then released as clean water after cleaning.

In a preferred embodiment of the method according to the invention, acid is added to the acidic solution depending on the concentration of metal in the waste gas and/or the amount of sulphur dioxide in the waste gas and/or the amount of chloride in the acidic solution. Because pre-cleaning takes place with an acidic solution and sulphur dioxide is removed with the alkaline solution, it becomes possible to adjust the pH of both kinds of solution relative to one another to an optimum value.

Particular advantages are achieved if the pH of the acidic solution is low. In a number of chemical processes the waste gas still contains oxygen in molecular form. This is the case, for example, if the waste gas is a flue gas from a combustion installation or if a waste gas originates from an extraction unit in which air is used as carrier gas for discharging undesired gaseous components from the chemical process.

When seawater is used as the alkaline solution, typically the pH before contact with the waste gas is 7.7 to 8.6.

As a result of cleaning the waste gas in two stages, the final pH in the stage in which an alkaline solution is used may be set higher than in a method in which only a single stage is used. As an example of the usefulness of this, oxidation of sulphur dioxide from sulphite t sulphate works better at this higher pH. Moreover, under those circumstances less release of sulphur dioxide to the atmosphere takes place. Indeed, oxidation is additionally encouraged by longer-lasting contact of the waste gas with the two kinds of solution compared with contact with a single kind of solution in the known method.

For environmental reasons, after it is used to clean the waste gas, the alkaline solution is aerated, using, for example, an aerator. One advantage of this is that it converts sulphite into sulphate and thereby reduces consumption of the chemical oxygen. The pH of the alkaline solution after the waste gas is cleaned is higher than with the known method which means that, for example, release of sulphur dioxide in the aerator is reduced.

Preferably the acidic solution is at a pH under 2, e.g. 1.5. This gives the advantage that due to a low pH during pre-cleaning, heavy metals such as nickel, chromium and calcium may be removed from the waste gas considerably better than with a high pH. If hydrochloric acid is used as acid the metals then combine as metal chloride that is easily removed in a downstream chemical water purification stage, for example, as metal hydroxide.

When the method of the invention is performed in this way the alkaline solution to be returned to surface water is considerably less laden with heavy metals.

Preferably, the waste gas is saturated with water vapor from the acidic solution. In many chemical processes the waste gas can still take up substantial amounts of water vapor. This means that the amount of used residual water which has to be cleaned in the chemical water purification stage reduces by the same amount. Because, within broad limits the investment and operating costs of chemical water purification are in proportion with the amount of water to be purified, the costs of chemical water purification also reduce substantially. At the same time the amount of water to be released becomes less which results in less imposition o and pollution of the environment.

When the proposed method is used for the removal of sulphur dioxide from waste gas, using seawater as alkaline solution, it gives a lower germicidal effect for the seawater released than the known method in which only one stage is used for scrubbing. This lower germicidal effect arises, among other reasons, from the smaller temperature rise of the seawater, the lower concentration of heavy metals, the lower dust loading, the higher oxygen content and, in a chemical process where fluorides are released, a smaller fluoride concentration.

Research has shown that a method according to the invention may be carried out economically when treating waste gases that have a sulphur dioxide concentration of up to approximately 1000 mg sulphur dioxide per normal cubic meter of waste gas.

In another aspect, the invention provides an apparatus for removing substances from a waste gas of a chemical process by gas-scrubbing the waste gas with alkaline solution which has two chambers, one for contacting the waste gas with an acidic solution, and another for contacting the waste gas with an alkaline solution. As an example, the chamber for contacting the waste gas, with an acidic solution can be a pre-absorber. The pre-absorber may be provided with a fluid supply for the acidic solution, and a fluid discharge unit linked to a water cleaning unit. In the pre-absorber the waste gas is relieved of a number of undesirable components such as PAHs, dust and heavy metals. At the same time the waste gas takes up water vapor so that delivery to the waste water purification unit is reduced. Removal of heavy metals may then be further improved in an apparatus which is provided with means for supplying an acidic component to the acidic solution.

Preferably according to the invention the apparatus is provided with means for analysing the waste gas, which are control-linked to means for metering an acidic component. In another embodiment the apparatus is provided with means for analysing the composition of the acidic solution or residual waste water which is to act as the acidic solution, and these means are control-linked to a means for supply of an acidic component.

In an apparatus according to the invention the pH of the acidic solution during removal of (for example) sulphur dioxide is held at a desired value by analysis of the waste gas and/or the acidic solution and, based on the measurement results, by conveying an acidic component to the acidic solution until a desired pH is reached.

Using the apparatus according to the invention it is possible to clean the waste gas in two stages by scrubbing with water, and the pH of the used water may be set in each stage. This achieves several advantages: heavy metals from the waste gas are removed to a large extent, the oxidation effect of sulphur dioxide is improved, the risk of release of sulphur dioxide in a downstream oxidation stage is reduced, the risk of sudden loading of seawater is substantially eliminated, and the germicidal effect of the released seawater is less, among other reasons, through the lower temperature rise of the released seawater.

INTRODUCTION OF THE DRAWINGS

The invention will now be illustrated, by way of example only, and with reference to the accompanying drawings, in which:

FIG. 1 schematically illustrates the method according to the invention, and

FIG. 2 is a schematic representation of the apparatus according to the invention.

DESCRIPTION OF THE PREFERRED EMBODIMENTS

Figure 1:
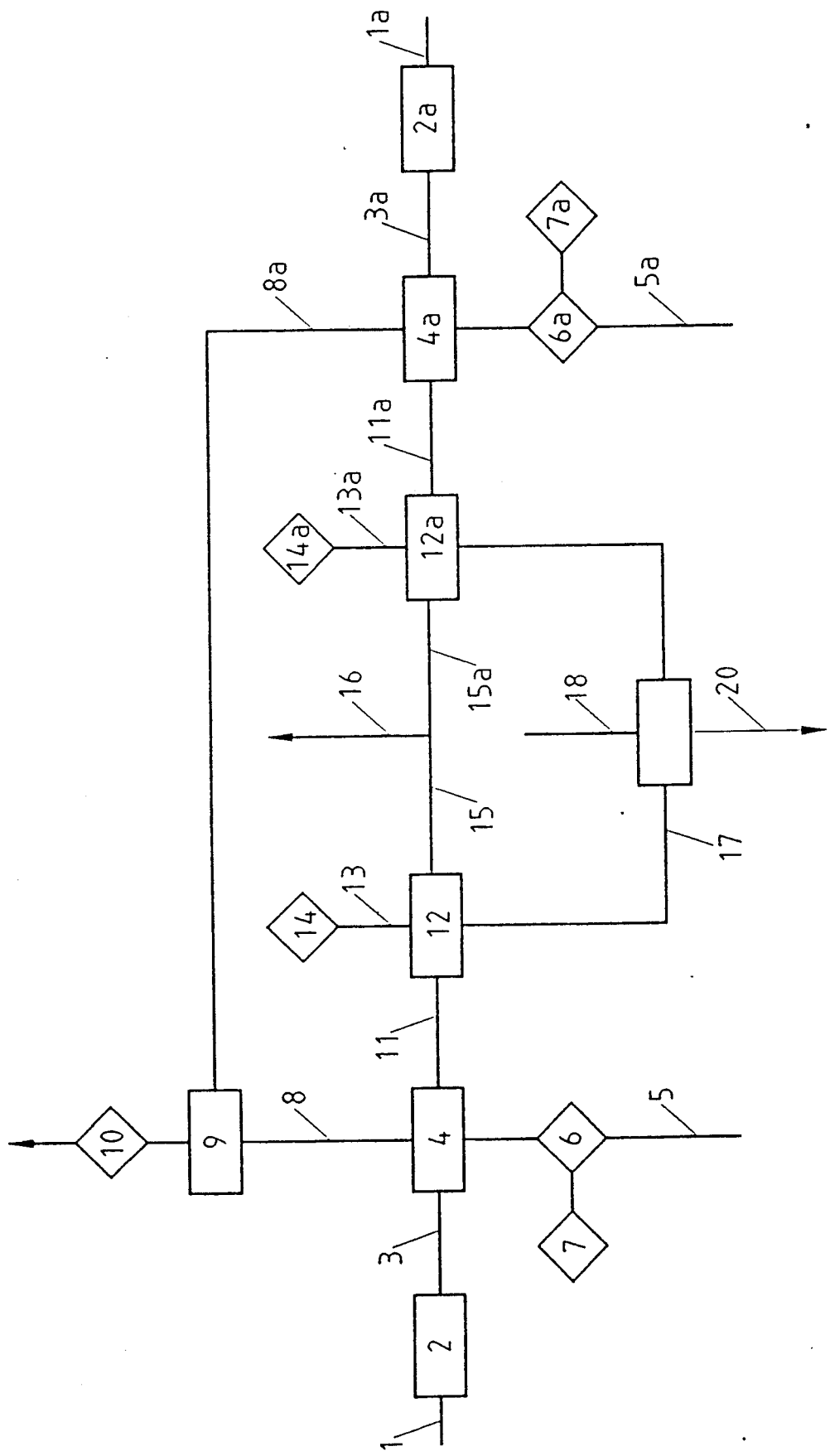

FIG. 1 shows a diagram in which sulphur dioxide is being removed from two flows of waste gas by applying the method in accordance with the invention twice, in parallel. In FIG. 1 elements with corresponding functions in each of the two flows are indicated by the same reference number, with or without the additional reference letter "a".

The two flows of waste gas may originate, for example, from two installations for the manufacture of aluminium from aluminium oxide by means of electrolysis. The electrolysis takes place in electrolytic cells into which aluminium oxide, among other things, is metered, and from which molten aluminium is tapped off. Gases produced during the process are extracted above each electrolytic cell as waste gas. In addition to oxygen and nitrogen air, the waste gas also contains sulphur dioxide, carbon dioxide and carbon monoxide, fluoride, heavy metals, PAHs and other hydrocarbons and large amounts of dust. The sulphur dioxide content is in the range approximately 100-400 mg per normal cubic meter, with a typical value of 250 mg/Nm$^3$.

In FIG. 1 line 1 is the supply of the waste gas to be cleaned from which fluorine is being removed in a dry flue cleaning stage 2. The waste gas flows through a pipe 3 to a first cleaning stage 4 in which the acidic scrubbing takes place with aqueous acidic waste water. The acidic waste water is conveyed through pipe 5 as used residual water.

In the manufacture of aluminium from aluminium oxide the residual water obtained contains chlorinated waste water from the foundry of aluminium ingots, drain water from cooling towers, leakage water from the pit floors beneath the electrolysis cells and possibly rainwater which contains metal. This residual water is used for the acidic solution for gas-scrubbing, in this embodiment of the invention.

The used residual water is mixed in a mixing vessel 6 with an acid, e.g. HCl, originating from a storage vessel 7. The addition of acid may take place on the basis of the measured or otherwise known composition of the used residual water and/or according to the composition of the waste gas. The pH aimed at is less than 2, e.g. 1.5.

From the first cleaning stage 4 the used residual water flows through a pipe 8 to a buffer vessel 9 from which the two pipes 8 and 8a emerge. The buffer vessel 9 is linked to a chemical water purification unit 10.

The pre-cleaned waste gases from the first cleaning stage 4 flow from a pipe 11 to the sulphur dioxide scrubber 12. Seawater, e.g. of initial pH 8.0, is added to the sulphur dioxide scrubber 12 through a pipe 13 by means of an inlet system 14. The cleaned waste gas leaves the sulphur dioxide scrubber 12 via a pipe 15 which is linked to a chimney stack 16. The target value for the sulphur dioxide content in the exhaust gas after cleaning is 25 mg/Nm$^3$, which is achievable.

The seawater from the sulphur dioxide scrubber having for example a pH of 6.2 (from an initial pH of 8.0) is conveyed along a pipe 17 to a seawater oxidation stage (aerator) in which sulphite dioxide in the seawater is oxidized by means of air supplied through a pipe 18. The seawater thus processed is drained off through pipe 20.

It has been found that the reaction of bicarbonate in the seawater with absorbed sulphur dioxide results in the formation of carbon dioxide that leaves the seawater, thereby raising the pH towards its original value.

Figure 2:
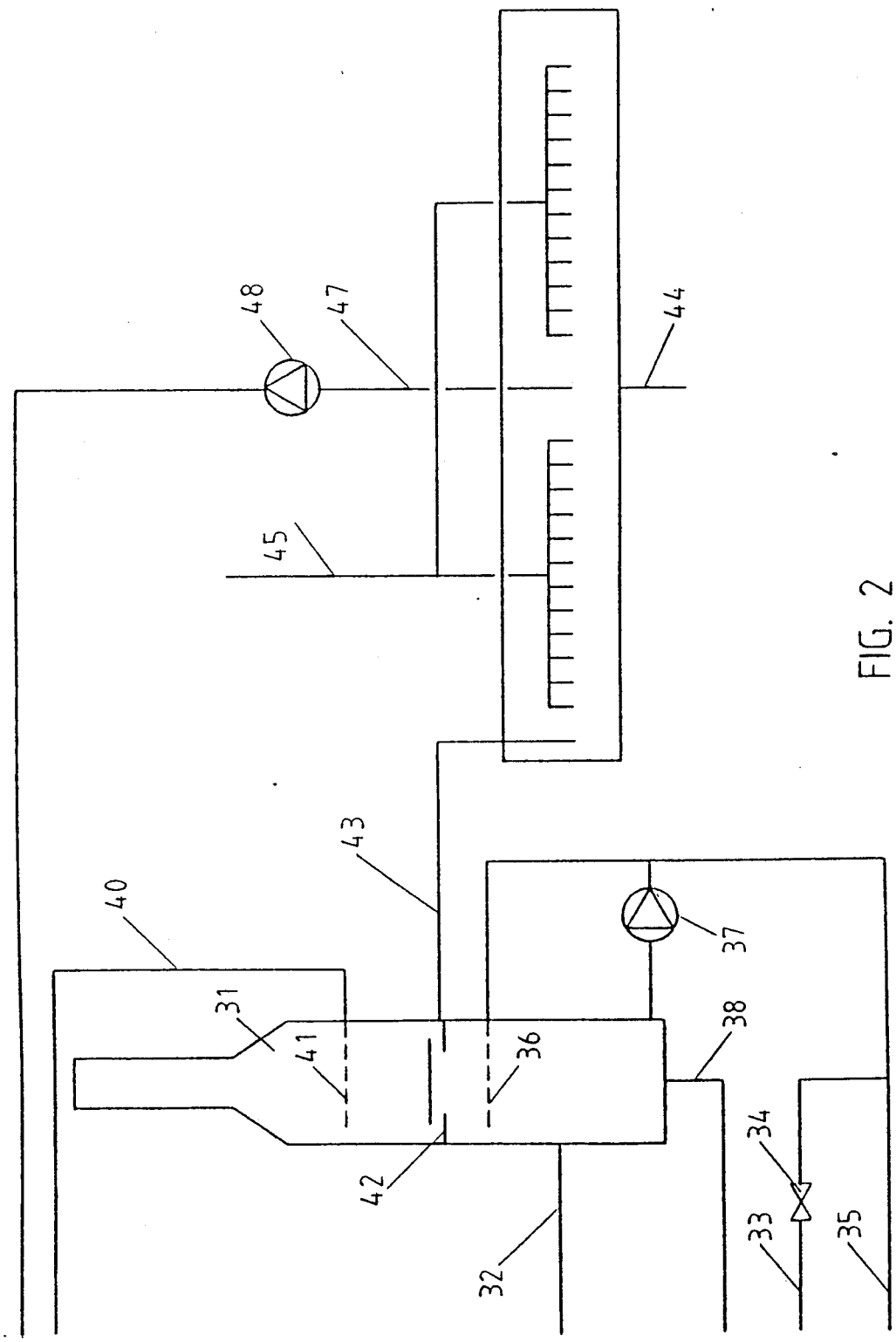

FIG. 2 shows a single-flow apparatus in accordance with the invention. A twin-flow embodiment, corresponding to FIG. 1, is within the scope of the expert.

FIG. 2 shows a two-stage scrubbing tower 31 provided with an inlet 32 for the waste gas to be cleaned. A pipe 33 is connected to a storage vessel for acid. The pipe 33 has a control valve 34 which allows passage of the permitted amount of acid depending on a control signal originating from measurement means not shown in the drawing which analyse the used residual water and/or the waste gas to be cleaned.

The acid from the pipe 33 is mixed in a pipe 35 with the flow of used residual water which passes along the pipe 35. The pipe 35 emerges into a spray system 36 of the first, and bottom stage of the scrubber tower. If desired, a part of the used residual water may be recirculated by means of a pump 37. Used residual water leaves the scrubber tower through a pipe 38 to go to a chemical water cleaning unit not shown in the drawing.

Seawater, which is alkaline, is conveyed along a pipe 40 and sprayed through sprayers 41 into one or more spray layers at the top of the scrubber tower. Seawater dropping down is fed out via a gutter 42, through a pipe 43 to the oxidation tank 44. The oxidation tank 44 has a coupling pipe 45 for air which is bubbled into the oxidation tank by a diffuser. Used seawater is drained out of the oxidation tank 44 by means of a pipe 47 and a pump 48.

Although described here for a use in a process of winning aluminium by electrolysis, the invention is applicable in a similar manner to other processes of electrolysis of metal oxides to gain the metal. Another possible use of the invention is in cleaning exhaust gases from a sintering plant for preparing iron ore as a feedstock for a blast furnace.

The acid water, or a water which is to be used as the acid water, can be chosen from a variety of supplies e.g. drinking water, river-water, spring water or a waste water. This waste water is present in industry again in a great variety: cooling tower blow-off water, cooling water from a casting process, collected rain water. The desired pH of the water in the first washing step is 1.5. This is reached due to the acid contaminants in the exhaust gas or by extra addition of acid. The value of 1.5 will result in a high solubility of metallic contaminants.

What is claimed is:

1. A method of reducing the contamination of seawater used in a process of removing sulfur dioxide from a waste gas by scrubbing said waste gas with said seawater, characterized in that prior to said scrubbing, said waste gas is precleaned by contacting it with an acidic solution.

2. The method according to claim 1 wherein said acidic solution is residual water from a chemical process.

3. The method according to claim 1 including, after said precleaning, cleaning said acidic solution.

4. The method according to claim 1 including adding acid to said acidic solution, at least one of before and during said precleaning.

5. The method according to claim 4 wherein the amount of acid added is selected in dependence on the amount of sulphur dioxide in the gas.

6. The method according to claim 4 wherein the amount of acid added is selected in dependence on at least one of a concentration of metal in said gas and the amount of chloride in said acidic solution.

7. The method according to claim 4 wherein said added acid is hydrochloric acid.

8. The method according to claim 1 wherein the pH of said acidic solution is below 2 during said precleaning.

9. The method according to claim 1 including aerating said seawater after contact with the waste gas.

10. The method according to claim 1 wherein said waste gas is saturated with water vapor from said acidic solution during the precleaning.

* * * * *